M. H. FISHER.
File Cutter.
No. 14,189.
Patented Feb. 5, 1856.
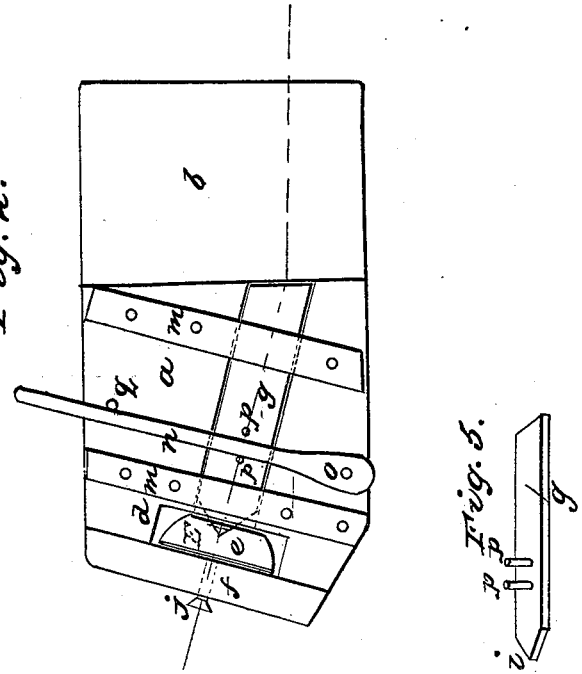
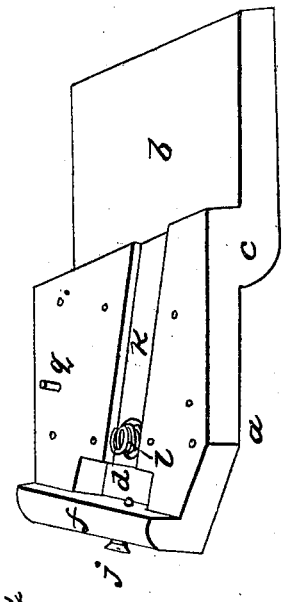
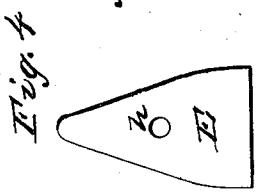
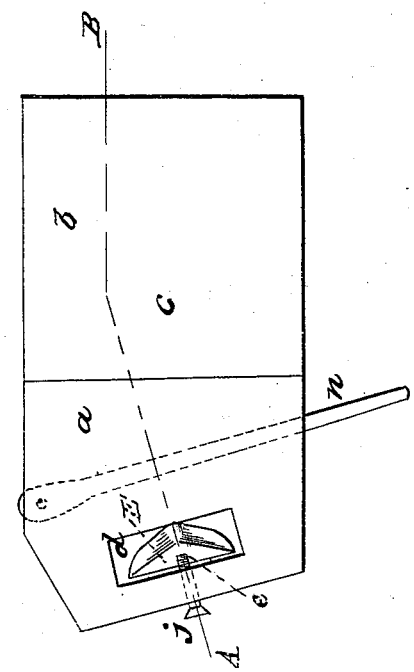
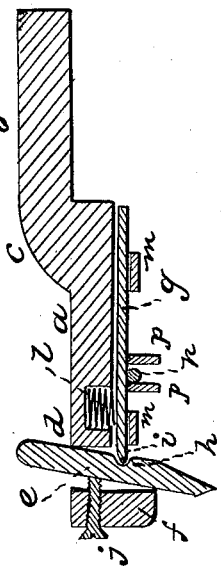
Witnesses:
Jackson Hyatt
J. Wallace Robinson
Inventor:
Major H. Fisher.

UNITED STATES PATENT OFFICE.

MAJOR H. FISHER, OF SING SING, NEW YORK, ASSIGNOR TO JOS. A HYDE.

CUTTING FILES.

Specification of Letters Patent No. 14,189, dated February 5, 1856.

*To all whom it may concern:*

Be it known that I, MAJOR H. FISHER, of Sing Sing, Westchester county, New York, have invented a new and useful Improvement in File-Cutting Machinery; and I do hereby declare that the following description, with the accompanying drawings, forms a full, clear, and exact specification thereof.

My said invention is an improvement upon the invention heretofore made by me, and patented to said Hyde, assignee thereof, August 28th 1846.

It consists of an improved chisel arm and holder whereby the teeth in the blank can be cut with increased precision and rapidity; it is applicable to the machinery described in said patent or any other file cutting machinery now in use, requiring a chisel-arm and holder actuated by shafts and cams, or other suitable device; such machinery being well known, need not be described.

To enable others skilled in the art to make and use my present improvement, I describe its construction and operation, reference being had to the accompanying drawings, as follows:

Figure 1 is a top view of my chisel arm and holder with the chisel in its place. Fig. 2 is a bottom view of the same. Fig. 3 is a vertical longitudinal section of the same in the line A, B, of Fig. 1. Fig. 4 is a view of the back side of the chisel. Fig. 5 is a perspective view of the sliding chisel holder. Fig. 6 is a perspective view of the groove in which the chisel holder slides, with the coiled spring in its hole under the front end of the holder.

I construct my chisel arm (*a*) of iron or other strong material, of suitable length, breadth, and thickness for the machinery with which it is to be used. I make the inner end (*b*) of said arm of suitable form to be connected with, and actuated by, the actuating shaft. I make a bend (*c*) in about the middle of the arm, carrying its outer half down about once its thickness, for the purpose of giving the requisite draw and push movement to the edge of the chisel as actuated in cutting the blank. I make an oblique slot (*d*) through the outer end of the arm to receive the chisel (*e*), so as to cut the teeth obliquely across the blank; and I shape the outer end of the arm in conformity with this slot, as seen in the drawing. On the lower side of the outer end of the chisel arm, in front of the chisel slot I make a lower ledge or lip (*f*) against which the chisel is pressed by the sliding chisel holder (*g*).

I make the chisel substantially in the form shown in Fig. 4, with a pivot-hole (*h*) on the back side to receive and turn upon the point (*i*), of the chisel holder. The edge of the chisel is formed by a broad bevel on the back side, and a narrow one on the front side, and the body of the chisel tapers to a head which is adapted to receive the blow of the striker. I make a set screw (*j*) in the outer end of the arm coming through into the slot and bearing against the front side of the chisel a little above the point of the holder on the other side, whereby the set of the chisel may be slightly adjusted.

On the under side of the outer half of the arm I make a shallow groove (*k*) at right angles with the chisel slot, to receive the sliding chisel holder. I gradually deepen this groove from the back to the front end, to allow the front end of the holder, a self adjusting up and down movement. Near the front end in the bottom of this groove I sink in a small hole to receive a suitable coiled spring (*l*) to press against the sliding chisel holder near its forward end. I fit the holder into this groove, and retain it in place by two cross strips (*m*) fastened on to the under side of the arm across the groove. I slide the chisel holder back and forth for the purpose of putting in and taking out the chisel, by means of the spring rod (*n*) turning on a joint pin (*o*) at one end, and passing between two pins (*p*) in the holder, and held near the other end by slipping over a fast pin (*q*). The chisel can thus by sliding the holder, be readily inserted and removed as occasion may require, and by means of the set screw, the set and firmness of the chisel can be suitably adjusted, and by the yielding of the spring rod, the chisel holder moves back slightly in its slot while the edge of the chisel is in the cut after each blow, and the blank is constantly feeding the rough, so as to prevent the breaking off, or snipping, of the edge of the chisel, or of the teeth, or of tooth, as would otherwise frequently happen.

Owing to the peculiar form of the blank, and the cutting of the teeth obliquely across it, the edge of the chisel must accommodate itself to the face of the blank for every blow of the striker, so as to cut each tooth of equal depth entirely across the blank.

The operation is as follows:—The chisel arm descends, bringing some part of the edge of the chisel to the face of the blank; the chisel rises slightly in its slot; the spring near the end of the chisel-holder is more or less compressed, and the chisel by turning slightly as required on the self adjusting point of the holder which is actuated by the yielding pressure spring, adapts or accommodates its edge to the blank entirely across its face, for every cut; after the blow of the striker on the head of the chisel, the arm rises; the spring throws the chisel slightly down, so as to be in advance of the arm when it again descends; and the operation is repeated for each successive cut.

The chisel is held with sufficient firmness to admit of rapid blows; from two hundred to two hundred and fifty a minute.

The structure is simple, and the operation is exact, which is of great practical importance in file cutting machinery.

I claim the sliding and self-adjusting chisel-holder, (g) constructed and operating substantially as described.

MAJOR H. FISHER.

Witnesses:
A. JACKSON HYATT,
J. WALLACE ROBINSON.